Patented Oct. 25, 1949

2,486,173

UNITED STATES PATENT OFFICE 2,486,173

PROCESS FOR PREPARING MESO-SUBSTITUTED CARBOCYANINE DYES AND THIOKETONES

Grafton H. Keyes, Rochester N. Y., assignor to Eastman Kodak Company, Rochester, N. Y., a corporation of New Jersey No Drawing. Original application March 4, 1943, Serial No. 478,007. Divided and this application October 3, 1945, Serial No. 620,162

12 Claims. (Cl. 260—240)

This invention relates to a process for preparing carbocyanine dyes and thioketones. This application is a division of my copending application Serial No. 478,007, filed March 4, 1943 (now abandoned).

In applications 356,656 and 356,657, each filed September 13, 1940 (now United States Patents 2,369,657 and 2,369,646, each dated February 20, 1945) of Leslie G. S. Brooker and Grafton H. Keyes, the preparation of thioketones from which valuable dye intermediates can be made is described. However, thioketones which can be made by these aforesaid processes are limited to those which can be represented by the following general formula:

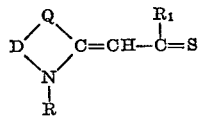

wherein D represents an organic radical selected from the group consisting of phenylene and naphthylene radicals, Q represents an atom selected from the group consisting of sulfur and selenium atoms, R and R' represent organic radicals selected from the group consisting of alkyl and aryl groups.

I have now found a new process for preparing such thioketones. By means of my new process I have been able to produce new thioketones which are not obtainable by the aforesaid processes. Moreover, by means of the new thioketones, I have been able to produce new dye intermediates and new cyanine dyes heretofore unattainable. Not only does my new process give rise to thioketones (as shown in my copending application Serial No. 478,007) but there are also produced simultaneously symmetrical meso-alkyl carbocyanine dyes, I have found. In some cases the thioketone is produced in larger amounts than the symmetrical meso-alkyl carbocyanine dye, while in other cases the meso-alkyl carbocyanine dye is formed almost to the exclusion of the thioketone.

It is accordingly an object of my invention to provide a new process for preparing thioketones and meso-alkyl symmetrical carbocyanine dyes. Another object is to provide new thioketones. Still a further object is to provide new dye intermediates. A still further object is to provide new cyanine dyes. Other objects will become apparent hereinafter.

In accordance with the invention, a quaternary salt of a heterocyclic nitrogen base containing an R—CH2— group (wherein R represents hydrogen or alkyl) in the alpha or gamma position (i. e. one of the so-called reactive position) is condensed with an ester of a dithiocarboxylic acid. Advantageously the condensation is effected in the presence of a basic condensing agent. As basic condensing agents, organic tertiary amines are advantageously employed, e. g. trialkylamines, pyridine, N-methylpiperidine, dimethylaniline, etc. As esters of dithiocarboxylic acids, methyl dithioacetate, methyl dithiopropionate, butyl dithioacetate, methyl dithiocyclohexane-carboxylate and methyl dithiobenzoate are exemplary. As quaternary salts of heterocyclic nitrogen bases containing an R—CH2— group in a reactive position, the following are exemplary: quaternary salts of the thiazole series (e. g. 2,4-dimethylthiazole, 2-methyl-4-phenylthiazole, 2-methylbenzothiazole, 2-ethylbenzothiazole, 5-chloro-2-methylbenzothiazole, 2-methyl - β - naphthothiazole, 2-methyl - α - naphthothiazole, 2-ethyl-β-naphthothiazole, etc.) quaternary salts of the selenazole series (e. g. 2,4-dimethylselenazole, 2-methyl-4-phenyl selenazole, 2-methylbenzoselenazole, 2-methyl-β-naphthoselenazole, 2-methyl-α-naphthoselenazole, etc.), quaternary salts of 2-methylthiazoline, quaternary salts of the quinoline series (e. g. quinaldine, lepidine, etc.), quaternary salts of 2,3,3-trimethylindolenine, etc.

Alkyl or aryl quaternary salts can be employed, e. g. methiodides, ethobromides, β-ethoxyethobromides, allobromides, β-hydroxyethobromides, β-acetoxyethobromides, metho - p - toluene-sulfonates, etho-p-toluenesulfonates, methomethylsulfates, pheniodides, etc. Alkiodides and alkobromides are advantageously employed where it is desired to isolate readily the meso-substituted carbocyanine dye which is formed, and alkoarylsulfonates, or alkoalkylsulfates are advantageously employed where it is desired to isolate the thioketone readily.

The following examples will serve to illustrate further the manner of practicing my invention.

*Example 1.*—*1-ethyl-2-thioacetylmethylene-1,2-dihydroquinoline*

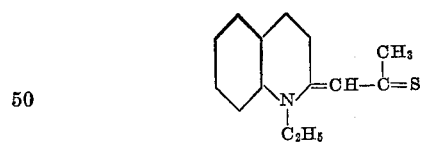

3.4 g. (1 mol.) of quinaldine etho-p-toluenesulfonate, 1 g. (1 mol.) of methyldithioacetate, 20 cc. of absolute ethyl alcohol and 1 g. (1 mol.)

of triethylamine were gently boiled under reflux for 30 minutes. To the cooled reaction mixture was then added 200 cc. of cold water. Thioketone precipitated. It was filtered off and twice recrystallized from 50 percent aqueous ethyl alcohol and obtained as lustrous brown plates, melting at 140 to 142° C. with decomposition. Only a small amount of 1,1'-diethyl-10-methyl-2,2'-carbocyanine p-toluenesulfonate was formed in this process and the thioketone was readily separated therefrom during the recrystallization, the dye remaining in the mother liquor from the recrystallization.

1-methyl-2-thiopropionyl - methylene-1,2-dihydroquinoline was similarly formed from quinaldine methiodide and methyldithiopropionate and obtained a dull bluish solid.

Example 2.—*3 - ethyl - 2 - thioacetylmethylenebenzothiazoline and 3,3'-diethyl-9-methylthiacarbocyanine iodide*

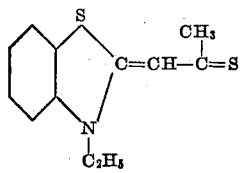

and

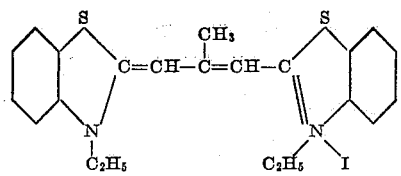

15.2 g. (2 mol.) of 2-methylbenzothiazole eth-iodide, 5.3 g. (1 mol.+100% excess) of methyl dithioacetate, 75 cc. of pyridine and 5 g. (2 mol.) of triethylamine were refluxed for 30 minutes. The resulting reaction mixture was chilled. The above formulated dye which separated was collected on a filter, washed with methyl alcohol and dried. The filtrate from the dye was diluted with a large volume of water whereupon more of the above formulated dye and thioketone separated together. The thioketone was extracted from the dye with acetone. The total yield of dye was 5 g. The thioketone was obtained from the acetone extract by evaporation of the acetone and washing the residual thioketone with methyl alcohol. The yield of thioketone was 6.3 g. After recrystallization from methyl alcohol, the thioketone was obtained as amber needles, having a blue reflex and melting at 142 to 144° C. with decomposition.

Example 3.—*3 - ethyl-2-thioacetylmethylenebenzothiazoline*

15.4 g. (1 mol.) 2-methylbenzothiazole etho-p-toluene-sulfonate, 4.7 g. (1 mol.) of methyl dithioacetate and 75 cc. of pyridine were refluxed for 30 minutes. The thioketone was precipitated from the reaction mixture along with some 3,3'-diethyl-9-methylthiacarbocyanine p-toluenesulfonate by adding 800 cc. of cold water to the cool reaction mixture. The product which precipitated was twice recrystallized from methyl alcohol and obtained as amber needles having a blue reflex and melting at 142 to 144° C. with decomposition. The 3,3'-diethyl-9-methylthiacarbocyanine p-toluenesulfonate which was formed remained in the mother liquors from the methyl alcohol recrystallizations.

Example 4.—*5-chloro-3-methyl-2-thiopropionyl-methylenebenzothiazoline*

7.4 g. (1 mol.) of 5-chloro-2-methylbenzothiazole metho-p-toluenesulfonate, 2.4 g. (1 mol.) of methyl dithiopropionate, 20 cc. of absolute ethyl alcohol and 2 g. (1 mol.) of triethylamine were refluxed for 30 minutes. 300 cc. of cold water was added to the cool reaction mixture, whereupon a mixture of the thioketone and 5,5'-dichloro-9-ethyl-3,3' - dimethylthiacarbocyanine p-toluenesulfonate precipitated. The mixture was twice recrystallized from methyl alcohol, and thioketone was obtained as orange needles, having a blue reflex and melting at 215 to 217° C. with decomposition. The carbocyanine dye remained in the mother liquors from the recrystallizations.

Example 5.—*1 - ethyl-2-thioacetylmethylene-β-naphthothiazoline and 3,3'-diethyl-9-methyl-4,5,4',5'-dibenzo-thiacarbocyanine bromide*

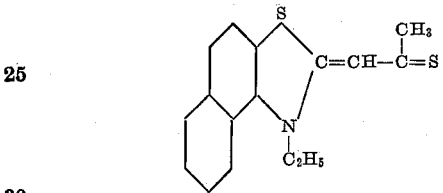

and

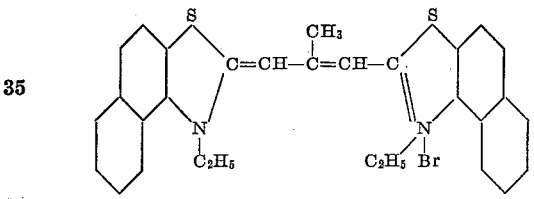

20 g. (2 mol.) of 2-methyl-β-naphthothiazole etho-p-toluenesulfonate, 5.3 g. (1 mol.+100% excess) of methyl dithioacetate, 50 cc. of pyridine and 5 g. (2 mol.) of triethylamine were refluxed for 30 minutes. To the cooled reaction mixture, an excess of a concentrated aqueous solution of potassium bromide was added, and the resulting mixture was chilled to 0° C. The carbocyanine dye (formulated above) was collected on a filter, washed well with acetone and dried. The combined filtrate and acetone washings were diluted with about 10 volumes of water and a mixture of the carbocyanine dye and thioketone separated. The solid material was collected on a filter and the thioketone separated from the dye by dissolving the thioketone out with acetone. The combined yield of dye was 2.2 g. The acetone washings were concentrated to near dryness, leaving a residue of very dark colored thioketone. The thioketone was purified by recrystallization from methyl alcohol and obtained as yellowish brown crystals melting at 196 to 198° C. Yield 2.9 g.

Example 6.—*1-ethyl-2-thioacetyl methylene-β-naphthothiazoline*

4 g. (1 mol.) of 2-methyl-β-naphthothiazole etho-p-toluenesulfonate, 1 g. (1 mol.) of methyl dithioacetate, 20 cc. of absolute ethyl alcohol and 1 g. (1 mol.) of triethylamine were refluxed for 30 minutes. The cooled reaction mixture was then diluted with 100 cc. of cold water, whereupon a mixture of the thioketone and 3,3'-diethyl-9-methyl-4,5,4',5'-dibenzothia - carbocyanine p-toluenesulfonate precipitated. The mixture was twice recrystallized from methyl alcohol, and thioketone was obtained as yellowish-brown crystals, melting at 196 to 198° C. The carbocyanine p-toluenesulfonate remained in the mother liquor from the recrystallizations.

*Example 7.—3,3',7-trimethylthiazolinocarbocyanine iodide*

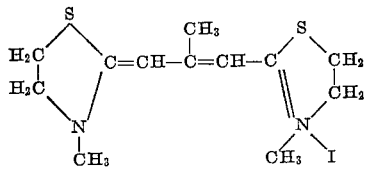

4.9 g. (2 mol.) of 2-methylthiazoline methiodide, 2 g. (1 mol.+100% excess) of methyl dithioacetate, 15 cc. of absolute ethyl alcohol and 2 g. (2 mol.) of triethylamine were refluxed together for 20 minutes. 20 cc. of cold water were added to the cooled reaction mixture whereupon the above formulated dye precipitated together with a very small amount of thioketone. Upon recrystallizing the precipitated product from ethyl alcohol, the above formulated dye was obtained in pure form, melting at 222 to 224° C. with decomposition.

*Example 8.—3-ethyl-4-phenyl-2-thioacetylmethylene-4-thiazoline*

6.6 g. (1 mol.) of 2-methyl-4-phenylthiazole ethiodide, 2 g. (1 mol.) of methyl dithioacetate, 15 cc. of absolute ethyl alcohol and 2 g. (1 mol.) of triethylamine were refluxed for 30 minutes. The cooled reaction mixture was diluted with one liter of cold water whereupon thioketone and 3,3'-diethyl-7-methyl-4,4'-diphenylthiazolocarbocyanine iodide precipitated. The precipitated mass was twice recrystallized from methyl alcohol and thioketone was obtained as amber crystals melting at 183 to 185° C. with decomposition. The carbocyanine iodide remained in the mother liquor from the recrystallization.

In a similar manner 3-ethyl-4-methyl-2-thioacetylmethylene-4-thiazoline can be prepared using 2,4-dimethylthiazole ethiodide; 3-ethyl-4-(2-thienyl)-2-thioacetyl methylene-4-thiazoline, using 2-methyl-4-(2-thienyl) thiazole ethiodide; 3-ethyl-4-methyl-2-thioacetylmethylene-4-selenazoline using 2,4-dimethylselenazole ethiodide; and 3-ethyl-4-phenyl-2-thioacetylmethylene using 2-methyl-4-phenylselenazole ethiodide.

*Example 9.—3-n-propyl-2-thioacetylmethylene-benzothiazoline*

6.4 g. (1 mol.) of 2-methylbenzothiazole n-propiodide, 2 g. (1 mol.) of methyl dithioacetate, 25 cc. of absolute ethyl alcohol and 2 g. (1 mol.) of triethylamine were refluxed for 30 minutes. The cooled reaction mixture was diluted with one liter of cold water, whereupon a mixture of the thioketone and 9-methyl-3,3'-di-n-propylthiacarbocyanine iodide precipitated. The precipitated mass was twice recrystallized from methyl alcohol and the thioketone was obtained as reddish orange crystals having a blue reflex and melting at 108 to 110° C. with decomposition. The carbocyanine iodide remained in the mother liquors from the recrystallizations.

*Example 10.—1-ethyl-4-thioacetylmethylene-1,4-dihydroquinoline*

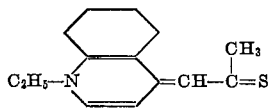

6 g. (1 mol.) of lepidine ethiodide, 2 g. (1 mol.) of methyl-dithioacetate, 20 cc. of absolute ethyl alcohol and 2 g. (1 mol.) of triethylamine were refluxed for 30 minutes. The cooled reaction mixture was diluted with one liter of cold water. The tarry mass which precipitated was extracted several times with hot ligroin. The combined ligroin extracts were chilled and the thioketone crystals which separated were filtered off and recrystallized from methyl alcohol. The thioketone was thus obtained as garnet crystals, having a green reflex, and melting at 161 to 163° C. with decomposition. Only a very small amount of 1,1'-diethyl-10-methyl-4,4'-carbocyanine iodide was formed.

*Example 11.—3-ethyl-2-thioacetylmethylene-α-naphthothiazoline*

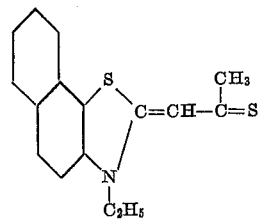

8 g. (1 mol.) of 2-methyl-α-naphthothiazole etho-p-toluenesulfonate, 2 g. (1 mol.) of methyl dithioacetate, 20 cc. of absolute ethyl alcohol and 2 g. (1 mol.) of triethylamine were refluxed for 15 minutes. The cooled reaction mixture was diluted with two liters of cold water, whereupon thioketone and 3,3'-diethyl-9-methyl-6,7,6',7'-dibenzothiacarbocyanine p-toluenesulfonate precipitated. The precipitated mass was filtered off, washed with a little methyl alcohol and dried. It was twice recrystallized from methyl alcohol and thioketone was obtained as amber crystals, melting at 221 to 223° C. with decomposition. The carbocyanine p-toluenesulfonate remained in the mother liquors from the recrystallization.

*Example 12.—3-ethyl-2-[α-(thioacetyl)ethylidene]-benzothiazoline*

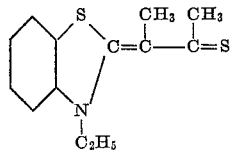

9.6 g. (1 mol.) of 2-ethylbenzothiazole ethiodide, 3 g. (1 mol.) of methyl dithioacetate, 45 cc. of absolute ethyl alcohol and 3 g. (1 mol.) of triethylamine were refluxed for 15 minutes. The cooled reaction mixture was diluted with 1½ liters of cold water, whereupon thioketone and 3,3'-diethyl-8,9-dimethyl-thiacarbocyanine iodide precipitated. The precipitated mass was stirred with 50 cc. of cold ethyl alcohol and filtered from the ethyl alcohol. The resulting solid material was twice recrystallized from ligroin giving thioketone in the form of red-brown needles, melting at 123 to 126° C.

*Example 13.—2-cyclohexylthioformylmethylene-3-ethylbenzothiazoline*

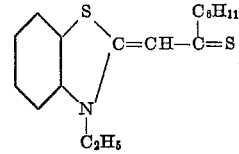

14 g. (1 mol.) of 2-methylbenzothiazoline etho-p-toluenesulfonate, 7 g. (1 mol.) of the methyl ester of dithiocyclohexane carboxylic acid, 40 cc. of absolute ethyl alcohol and 4 g. (1 mol.) of triethylamine were heated under reflux for 30 minutes. The cool reaction mixture was diluted with 2 liters of cold water whereupon thioketone and 9 - cyclohexyl - 3,3' - diethylthiacarbocyanine p-toluenesulfonate precipitated. The precipitated mass was extracted several times with hot ligroin. The thioketone which separated from the combined ligroin extract upon chilling were recrystallized twice from ligroin and once from methyl alcohol. The thioketone was obtained as orange needles melting at 146 to 148° C.

*Example 14.—1-methyl-2-[α-(thiopropionyl)-ethylidene]-β-naphthothiazoline*

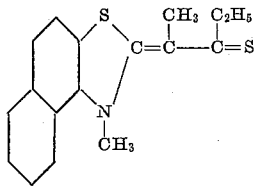

16 g. (1 mol.) of 2-ethyl-β-naphthothiazole metho-p-toluenesulfonate, 4.3 g. (1 mol.) of methyldithiopropionate, 35 cc. of absolute ethyl alcohol and 8 g. (2 mol.) of triethylamine were placed together in a 200 cc. flask and heated under reflux for 30 minutes. The reaction mixture was then poured into about 1 liter of cold water and chilled. The solid which separated was collected on filter, washed with water and methyl alcohol and dried. A portion of it was purified by recrystallization from methyl alcohol and was obtained as brownish crystals melting at 167 to 196° C. with decomposition. The 2-ethyl-β-naphthothiazole metho-p-toluenesulfonate employed above was prepared as follows:

31.9 g. (1 mol.) of 2-ethyl-β-naphthothiazole and 27.9 g. (1 mol.) of methyl-p-toluenesulfonate were heated together in an oil bath at 125 to 130° C. for 3 hours and then on a steam bath for a further 24 hours. A solid mass of crystals was formed. It was dissolved in 60 cc. of boiling methyl alcohol. The solution was chilled and the salt was precipitated on addition of about 500 cc. of acetone and chilling. It was collected on filter, washed with acetone and dried. Yield 41.5 g. (70 per cent of theoretical). The 2-ethyl-β-naphthothiazole employed above was prepared as follows:

745 g. (1 mol.) of n-propionyl-α-naphthylamine was dissolved in 2500 cc. of dry toluene and heated to steam bath temperature. 422 g. (½ mol.) of phosphorus pentasulfide was added in small portions with mechanical stirring. Heating and stirring were continued for ten minutes after the additions of the P₂S₅. The hot toluene solution was decanted from a very sticky residue onto ice. 200 cc. of 40 per cent NaOH was added to the water toluene mixture which was then well stirred. Layers were separated. Thiopropionyl-α-naphthylamine was precipitated on making the aqueous layer acidic by addition of a slight excess of acetic acid, keeping the mixture cold by addition of ice. This was collected on filter and redissolved in dilute sodium hydroxide. The dilute alkaline solution was filtered. The solution was chilled by addition of ice and then the thiopropionyl-α-naphthylamine was reprecipitated on addition of acetic acid. It was collected on filter and washed with water. It was then again redissolved in dilute sodium hydroxide. To this alkaline solution, chilled by means of ice, was added excess of a water solution of potassium ferricyanide. 2-ethyl-β-naphthothiazole separated from solution and was taken up in ether. The ether solution was dried over potassium carbonate and then concentrated. The base was twice distilled. B. P. 147 to 150° at 2 mm. of Hg pressure.

*Example 14a.—3-methyl-2[α-(thiopropionyl)-ethylidene]-benzothiazoline*

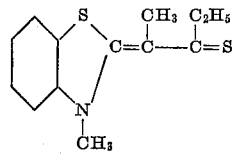

17.3 g. (1 mol.) of 2-ethylbenzothiazole metho-p-toluenesulfonate, 50 cc. of absolute ethyl alcohol, 6 g. (1 mol.) of methyldithiopropionate and 10 g. (2 mol.) of triethylamine were heated together under reflux for 30 minutes. The reaction mixture was then poured out into about 1500 cc. of cold water and the mixture allowed to stand at about 0° for two hours. The product separated as a rather sticky mass. After decantation of the liquors, the residue was stirred up with about 50 cc. of methyl alcohol and chilled. It was then collected on filter, washed with methyl alcohol and dried. The thioketone was of sufficient purity for use in making quaternary salts.

In a manner similar to that illustrated in the foregoing examples, 1-phenyl-2-thioacetylmethylene benzothiazoline can be prepared by condensing 2-methyl benzothiazole pheniodide with methyl dithioacetate'. 2 - methylbenzothiazole pheniodide is described in U. S. Patent 2,317,357, dated April 27, 1943.

Any of the thioketones obtained in accordance with my new process can be converted to alkylmercapto compounds by heating the thioketone with an alkyl salt. Alkyl aryl-sulfonates, e. g. methyl or ethyl p-toluenesulfonate, are advantageously employed. Alkyl halides, e. g. bromides or iodides, dialkyl sulfates, etc. can be used. The following examples illustrate further the formation of the alkylmercaptovinyl compounds.

*Example 15.—2-(2-methylmercaptopropenyl) quinoline etho-p-toluenesulfonate*

0.6 g. (1 mol.) of 1-ethyl-2-thioacetylmethylene-1,2-dihydroquinoline and 0.5 g. (1 mol.) of methyl-p-toluenesulfonate were heated together on a steam bath for 30 minutes. A viscous mass of 2 - (β - methylmercaptopropenyl) - quinoline etho-p-toluenesulfonate was formed.

*Example 16.—2-(2-methylmercapto-1-butenyl)-quinoline metho-p-toluenesulfonate*

1.15 g. (1 mol.) of 1-methyl-2-thiopropionylmethylene-1,2-dihydroquinoline and 1 g. (1 mol.) of methyl-p-toluenesulfonate were heated together on a steam bath for 30 minutes. A fused mass of 2-(2-methylmercapto-1-butenyl)-quinoline metho-p-toluenesulfonate was formed.

*Example 17.—2-(2-methylmercaptopropenyl)-4-phenylthiazole etho-p-toluenesulfonate*

1.3 g. (1 mol.) of 3-ethyl-4-phenyl-2-thioacetylmethylene-4-thiazoline and 1 g. (1 mol.) of methyl-p-toluenesulfonate were heated together on a steam bath for 30 minutes. A fused mass of 2 - (2 - methylmercaptopropenyl)-4-phenylthiazole etho-p-toluenesulfonate was formed.

In a similar manner 2-(2-methyl-mercaptopropenyl)-4-methylthiazole etho - p - toluenesulfonate was formed from 3-ethyl-4-methyl-2-thioacetylmethylene-4-thiazoline; 2-(2-methylmercaptopropenyl)-4-phenylselenazole etho-p-toluenesulfonate from 3-ethyl-4-phenyl-2-thioacetylmethylene-4-selenazoline and 2-(2-methylmercaptopropenyl)-4-methylselenazole etho-p-toluenesulfonate from 3-ethyl-4-methyl-2-thioacetylmethylene-4-selenazoline.

Any of the alkylmercapto compounds can be condensed with cyclammonium quaternary salts containing a reactive alkyl group, e. g. methyl, ethyl, etc. in the α- or γ-position, to give meso-substituted carbocyanine dyes. The condensations are advantageously effected in the presence of a tertiary organic amine such as triethylamine. The alkylmercapto compounds can also be condensed with heterocyclic compounds containing in the heterocyclic ring a ketomethylene group, e. g. rhodanines, 2-thio-2,4(3,5)-oxazolediones, etc. to give chain-substituted merocarbocyanine dyes.

What I claim as my invention and desire to be secured by Letters Patent of the United States is:

1. A process for simultaneously preparing a meso-substituted carbocyanine dye and a thioketone comprising condensing a quaternary salt of a heterocyclic nitrogen base containing in a position selected from the α- and γ-positions a —CH$_2$—R group wherein R represents a member selected from the group consisting of hydrogen and an alkyl group, with an ester of a dithiocarboxylic acid, and separating the carbocyanine dye from the thioketone.

2. A process for simultaneously preparing a meso-substituted carbocyanine dye and a thioketone comprising condensing a quaternary salt of a heterocyclic nitrogen base containing in a position selected from the α- and γ-positions a —CH$_2$—R group wherein R represents a member selected from the group consisting of hydrogen and an alkyl group, with an ester of a dithiocarboxylic acid, in the presence of a basic condensing agent, and separating the carbocyanine dye from the thioketone.

3. A process for simultaneously preparing a meso-substituted carbocyanine dye and a thioketone comprising condensing a quaternary salt of a heterocyclic nitrogen base containing in a position selected from the α- and γ-positions a —CH$_2$—R group wherein R represents a member selected from the group consisting of hydrogen and an alkyl group, with an ester of a dithiocarboxylic acid, in the presence of a tertiary organic amine, and separating the carbocyanine dye from the thioketone.

4. A process for simultaneously preparing a meso-substituted carbocyanine dye and a thioketone comprising condensing a quaternary salt of a heterocyclic nitrogen base containing in a position selected from the α- and γ-positions a —CH$_2$—R group wherein R represents a member selected from the group consisting of hydrogen and an alkyl group, with an ester of a dithiocarboxylic acid, in the presence of a trialkylamine, and separating the carbocyanine dye from the thioketone.

5. A process for simultaneously preparing a meso-substituted carbocyanine dye and the thioketone comprising condensing a quaternary salt of a heterocyclic nitrogen base containing in a position selected from the group consisting of α- and γ-positions a —CH$_2$—R group wherein R represents a member selected from the group consisting of hydrogen and an alkyl group, with an ester of a dithiocarboxylic acid, in the presence of pyridine, and separating the carbocyanine dye from the thioketone.

6. A process for simultaneously preparing a meso-substituted carbocyanine dye and a thioketone comprising condensing a quaternary salt of a quinoline containing a methyl group in a position selected from the group consisting of α- and γ-positions with an ester of a dithiocarboxylic acid, in the presence of a tertiary organic amine, and separating the carbocyanine dye from the thioketone.

7. A process for simultaneously preparing a meso-substituted carbocyanine dye and a thioketone comprising condensing a quaternary salt of a thiazole containing in the alpha position a methyl group with an ester of a dithiocarboxylic acid, in the presence of a tertiary organic amine, and separating the carbocyanine dye from the thioketone.

8. The thioketones represented by the following general formula:

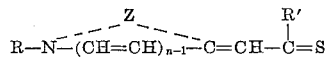

wherein R and R' represent an alkyl group containing from 1 to 2 carbon atoms, $n$ represents a positive integer of from 1 to 2, and Z represents the non-metallic atoms necessary to complete a quinoline nucleus.

9. 1-ethyl-2-thioacetylmethylene-1,2-dihydroquinoline.

10. 1-methyl-2-thiopropionylmethylene-1,2-dihydroquinoline.

11. 3-ethyl-4-phenyl-2-thioacetylmethylene-4-thiazoline.

12. A thioketone selected from the group consisting of those thioketones which are represented by the following general formulas:

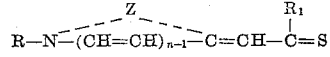

and

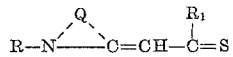

wherein R represents an alkyl group, R' represents a member selected from the group consisting of alkyl, cycloalkyl and aryl groups, $n$ represents a positive integer of from 1 to 2, Q represents the non-metallic atoms necessary to complete a heterocyclic nucleus selected from the group consisting of the 4-methyl-4-thiazoline, the 4-phenyl-4-thiazoline, and the 4-(2-thienyl)-4-thiazoline nuclei, and Z represents the non-metallic atoms necessary to complete a quinoline nucleus.

GRAFTON H. KEYES.

REFERENCES CITED

The following references are of record in the file of this patent:

UNITED STATES PATENTS

| Number | Name | Date |
|---|---|---|
| 2,310,640 | Kendall | Feb. 9, 1943 |
| 2,349,179 | Kumetat | May 16, 1944 |
| 2,354,524 | Kumetat | July 25, 1944 |
| 2,369,657 | Brooker | Feb. 20, 1945 |